US012592930B2

(12) United States Patent
Hu et al.

(10) Patent No.: US 12,592,930 B2
(45) Date of Patent: *Mar. 31, 2026

(54) GENERATING ZERO-TRUST POLICY FOR APPLICATION ACCESS BASED ON SEQUENCE-BASED APPLICATION SEGMENTATION

(71) Applicant: Zscaler, Inc., San Jose, CA (US)

(72) Inventors: Chenhui Hu, Lexington, MA (US); Devesh Solanki, Mohali (IN); Gaurav Garg, Bengaluru (IN); Shikhar Omar, Bengaluru (IN); Raimi Shah, Austin, TX (US); Dianhuan Lin, Sunnyvale, CA (US); Rex Shang, Los Altos, CA (US); Howie Xu, Palo Alto, CA (US)

(73) Assignee: Zscaler, Inc., San Jose, CA (US)

( * ) Notice: Subject to any disclaimer, the term of this patent is extended or adjusted under 35 U.S.C. 154(b) by 347 days.

This patent is subject to a terminal disclaimer.

(21) Appl. No.: 18/098,464

(22) Filed: Jan. 18, 2023

(65) Prior Publication Data

US 2023/0254318 A1 Aug. 10, 2023

Related U.S. Application Data

(63) Continuation-in-part of application No. 17/499,942, filed on Oct. 13, 2021.

(30) Foreign Application Priority Data

Jul. 22, 2022 (IN) .............................. 202214042160
Oct. 31, 2022 (IN) .............................. 202211061820

(51) Int. Cl.
*H04L 9/40* (2022.01)

(52) U.S. Cl.
CPC ............ *H04L 63/104* (2013.01); *H04L 63/20* (2013.01)

(58) Field of Classification Search
CPC .............................. H04L 63/104; H04L 63/20
(Continued)

(56) References Cited

U.S. PATENT DOCUMENTS 6,009,475 A 12/1999 Shrader
6,138,162 A 10/2000 Pistriotto et al.
(Continued)

FOREIGN PATENT DOCUMENTS

WO 2018053337 A1 3/2018
WO 2018152303 A1 8/2018

OTHER PUBLICATIONS

Jordaney, Roberto, et al., "Transcend: Detecting concept drift in malware classification models," 26th {USENIX} Security Symposium ({USENIX} Security 17), 2017.
(Continued)

*Primary Examiner* — Dereena T Cattungal
(74) *Attorney, Agent, or Firm* — Baratta Law PLLC; Lawrence A. Baratta, Jr.; Ryan Odessa

(57) ABSTRACT

Systems and methods include obtaining log data for a plurality of users of an enterprise where the log data relates to usage of a plurality of applications by the plurality of users and user metadata; analyzing the log data to determine one or more sequential patterns of application access; determining i) app-segments that are groupings of application of the plurality of applications and ii) user-groups that are groupings of users of the plurality of users, based on the log data and the one or more sequential patterns of application access; and providing access policy of the plurality of applications based on the user-groups and the app-segments. The one or more sequential patterns of application access include a sequence of accessing a plurality of applications in a given time period.

20 Claims, 15 Drawing Sheets

(58) Field of Classification Search
USPC .......................................................... 726/1
See application file for complete search history.

(56) References Cited

U.S. PATENT DOCUMENTS

| | | | |
|---|---|---|---|
| 7,316,029 B1 | 1/2008 | Parker et al. | |
| 7,350,229 B1* | 3/2008 | Lander ............... | H04L 63/0815 |
| | | | 726/8 |
| 7,383,569 B1 | 6/2008 | Elgressy et al. | |
| 7,620,985 B1 | 11/2009 | Bush et al. | |
| 7,647,318 B1* | 1/2010 | Enns ................... | G06F 21/6218 |
| | | | 707/999.006 |
| 8,166,533 B2 | 4/2012 | Yuan | |
| 8,499,348 B1 | 7/2013 | Rubin | |
| 8,677,471 B2 | 3/2014 | Karels et al. | |
| 9,065,850 B1 | 6/2015 | Sobrier | |
| 9,152,789 B2 | 10/2015 | Natarajan et al. | |
| 9,773,107 B2 | 9/2017 | White et al. | |
| 10,142,362 B2 | 11/2018 | Weith et al. | |
| 10,154,067 B2 | 12/2018 | Smith et al. | |
| 10,348,599 B2 | 7/2019 | O'Neil et al. | |
| 10,362,048 B2 | 7/2019 | Alexander et al. | |
| 10,419,477 B2 | 9/2019 | Desai et al. | |
| 10,439,985 B2 | 10/2019 | O'Neil | |
| 10,498,605 B2 | 12/2019 | Weith et al. | |
| 10,505,899 B1 | 12/2019 | Singh et al. | |
| 11,381,603 B2* | 7/2022 | Kirner .................... | H04L 45/50 |
| 2005/0193222 A1 | 9/2005 | Greene | |
| 2006/0095970 A1 | 5/2006 | Rajagopal et al. | |
| 2006/0117390 A1* | 6/2006 | Shrivastava ........ | H04L 61/4523 |
| | | | 726/27 |
| 2007/0233477 A1 | 10/2007 | Halowani et al. | |
| 2010/0115621 A1 | 5/2010 | Staniford et al. | |
| 2012/0246098 A1* | 9/2012 | Chari .................... | G06N 20/00 |
| | | | 706/12 |
| 2014/0095894 A1* | 4/2014 | Barton ............... | G06F 21/6218 |
| | | | 726/1 |
| 2015/0242486 A1* | 8/2015 | Chari ..................... | G06F 16/35 |
| | | | 707/737 |
| 2016/0344770 A1 | 11/2016 | Verma et al. | |
| 2017/0063886 A1 | 3/2017 | Muddu et al. | |
| 2017/0078329 A1 | 3/2017 | Hwang et al. | |
| 2017/0272465 A1 | 9/2017 | Steele | |
| 2018/0041471 A1 | 2/2018 | Sudo et al. | |
| 2018/0150758 A1 | 5/2018 | Niininen et al. | |
| 2018/0293381 A1 | 10/2018 | Tseng et al. | |
| 2019/0158513 A1* | 5/2019 | Shtar ..................... | G06F 21/552 |
| 2019/0163929 A1* | 5/2019 | Miller .................. | H04L 63/102 |
| 2019/0281073 A1 | 9/2019 | Weith et al. | |
| 2019/0318100 A1* | 10/2019 | Bhatia .................. | G06F 21/554 |
| 2019/0319972 A1 | 10/2019 | Desai | |
| 2019/0349283 A1 | 11/2019 | O'Neil et al. | |
| 2020/0021618 A1 | 1/2020 | Smith et al. | |
| 2020/0236112 A1 | 7/2020 | Pularikkal et al. | |
| 2020/0252405 A1* | 8/2020 | Sankavaram .......... | G06F 21/62 |
| 2020/0387956 A1* | 12/2020 | Toh ....................... | H04L 63/104 |
| 2021/0168150 A1* | 6/2021 | Ross .................. | G06F 16/9024 |
| 2021/0248053 A1* | 8/2021 | Wei ..................... | G06F 11/3404 |

OTHER PUBLICATIONS

Kantchelian, Alex, J. D. Tygar, and Anthony Joseph, "Evasion and hardening of tree ensemble classifiers," International Conference on Machine Learning, 2016.

Tolomei, Gabriele, et al., "Interpretable predictions of tree-based ensembles via actionable feature tweaking," Proceedings of the 23rd ACM SIGKDD International Conference on Knowledge Discovery and Data Mining. ACM, 2017.

Aug. 13, 2019, International Preliminary Report on Patentability and Written Opinion for International Application No. PCT/US2018/015902.

Aug. 20, 2019, International Preliminary Report on Patentability and Written Opinion for International Application No. PCT/US2018/018325.

Feb. 28, 2023, European Search Report for European Patent Application No. 22 18 7223.

* cited by examiner

User id embedding    User features    Item id embedding    Item features

600

602 OBTAINING LOG DATA FOR A PLURALITY OF USERS OF AN ENTERPRISE WHERE THE LOG DATA RELATES TO USAGE OF A PLURALITY OF APPLICATIONS BY THE PLURALITY OF USERS AND USER METADATA

604 ANALYZING THE LOG DATA TO DETERMINE ONE OR MORE SEQUENTIAL PATTERNS OF APPLICATION ACCESS

606 DETERMINING I) APP-SEGMENTS THAT ARE GROUPINGS OF APPLICATION OF THE PLURALITY OF APPLICATIONS AND II) USER-GROUPS THAT ARE GROUPINGS OF USERS OF THE PLURALITY OF USERS, BASED ON THE LOG DATA AND THE ONE OR MORE SEQUENTIAL PATTERNS OF APPLICATION ACCESS

608 PROVIDING ACCESS POLICY OF THE PLURALITY OF APPLICATIONS BASED ON THE USER-GROUPS AND THE APP-SEGMENTS

FIG. 13

GENERATING ZERO-TRUST POLICY FOR APPLICATION ACCESS BASED ON SEQUENCE-BASED APPLICATION SEGMENTATION

CROSS-REFERENCE TO RELATED APPLICATION(S)

The present disclosure is a continuation-in-part of U.S. patent application Ser. No. 17/499,942, filed Oct. 13, 2021, the contents of which are incorporated by reference in their entirety.

FIELD OF THE DISCLOSURE

The present disclosure generally relates to computer networking systems and methods. More particularly, the present disclosure relates to systems and methods for generating zero-trust policy for application access based on sequence-based application segmentation.

BACKGROUND OF THE DISCLOSURE

Enterprises are using more and more applications as time goes by. Also, the enterprise network has changed as users are remote and the resources and applications are being hosted in the cloud. The traditional view of an enterprise network (i.e., corporate, private, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is an example cloud service that provides seamless, zero trust access to private applications running on the public cloud, within the data center, within an enterprise network, etc. As described herein, ZPA is referred to as zero trust access to private applications or simply a zero-trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps). As described herein, the term private applications (or simply applications) is used to any secure application offered to users associated with an enterprise. The private applications can be cloud-hosted, offered via a ZTNA service, hosted within an enterprise network, and the like. Also, the private applications can be exposed to all users such as while within the well-defined perimeter.

Everyone agrees zero-trust is the best policy for security. But in reality, it is difficult to configure as it is time-consuming. As such, an enterprise with a large network and large number of users typically utilizes "wildcard rules" allowing access to every user in an enterprise. Those wildcard rules allowing everyone in the company to access certain applications. In fact, some application can include important resources for the company, e.g., the code base. You can imagine, that leaves potential attack surface for both external threat and insider threat.

Microsegmentation is one area of zero-trust focusing on application-to-application traffic. There is a need to provide user-to-application policy recommendations for zero-trust. Such policies are needed to reduce the attack surface, but also need to be high quality in terms of the recommendations.

BRIEF SUMMARY OF THE DISCLOSURE

The present disclosure relates to systems and methods for generating zero-trust policy for application access based on sequence-based application segmentation. Of note, the present disclosure automates application access for users based on monitoring user activity and recognizing that there are sequential patterns of application access. Leveraging sequential patterns of application access is shown to significantly improve application segmentation metrics.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. Systems and methods include obtaining log data for a plurality of users of an enterprise where the log data relates to usage of a plurality of applications by the plurality of users and user metadata such as department, job title, etc.; analyzing the log data to determine one or more sequential patterns of application access; determining i) app-segments that are groupings of application of the plurality of applications and ii) user-groups that are groupings of users of the plurality of users, based on the log data and the one or more sequential patterns of application access; and providing access policy of the plurality of applications based on the user-groups and the app-segments. The one or more sequential patterns of application access include a sequence of accessing a plurality of applications in a given time period.

Also, the present disclosure relates to systems and methods for generating zero-trust policy for internal network application access using machine learning. The present disclosure relates to analyzing user-to-application traffic and determining zero trust policies based thereon. The present disclosure automatically provides policy recommendations for private application access. Currently, IT personnel are required to manage private application policy and this feature can significantly reduce onboarding. For example, typical onboarding for new applications can be six months or more, but with the present disclosure, this can be reduced to just over a month where the first month is purely for machines to observe the traffic. The facilitation will encourage more ZTNA adoption. Without auto policy recommendation, the policies are defined manually at coarse grain, which does not leverage the power of fine-grained access control. An example policy can include user group X can access a segment group Y with port Z, where a segment group is an app-segment and an app-segment is a group of apps (domains).

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. Systems and methods include obtaining log data for a plurality of users of an enterprise where the log data relates to usage of a plurality of applications by the plurality of users; determining i) app-segments that are groupings of application of the plurality of applications and ii) user-groups that are groupings of users of the plurality of users; and providing access policy of the plurality of applications based on the user-groups and the app-segments. The steps can further include monitoring the access policy over time based on ongoing log data, manual verification of the access policy, and incidents where users are prevented from accessing any application; and adjusting the determined based on the monitoring.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a user device, which may be used with the cloud-based system or the like.

FIG. 13 is a flowchart of a process for generating zero-trust policy for application access based on sequence-based application segmentation.

DETAILED DESCRIPTION OF THE DISCLOSURE

Again, the present disclosure relates to systems and methods for generating zero-trust policy for application access based on sequence-based application segmentation. Of note, the present disclosure automates application access for users based on monitoring user activity and recognizing that there are sequential patterns of application access. Leveraging sequential patterns of application access is shown to significantly improve application segmentation metrics.

Again, the present disclosure relates to systems and methods for generating zero-trust policy for internal network application access using machine learning. The present disclosure relates to analyzing user-to-application traffic and determining zero trust policies based thereon. The present disclosure automatically provides policy recommendations for private application access. Currently, IT personnel are required to manage private application policy and this feature can significantly reduce onboarding. For example, typical onboarding for new applications can be six months or more, but with the present disclosure, this can be reduced to just over a month where the first month is purely for machines to observe the traffic. The facilitation will encourage more ZTNA adoption. Without auto policy recommendation, the policies are defined manually at coarse grain, which does not leverage the power of fine-grained access control. An example policy can include user group X can access a segment group Y with port Z, where a segment group is an app-segment and an app-segment is a group of apps (domains).

Example Cloud-Based System Architecture

Figure 1A:
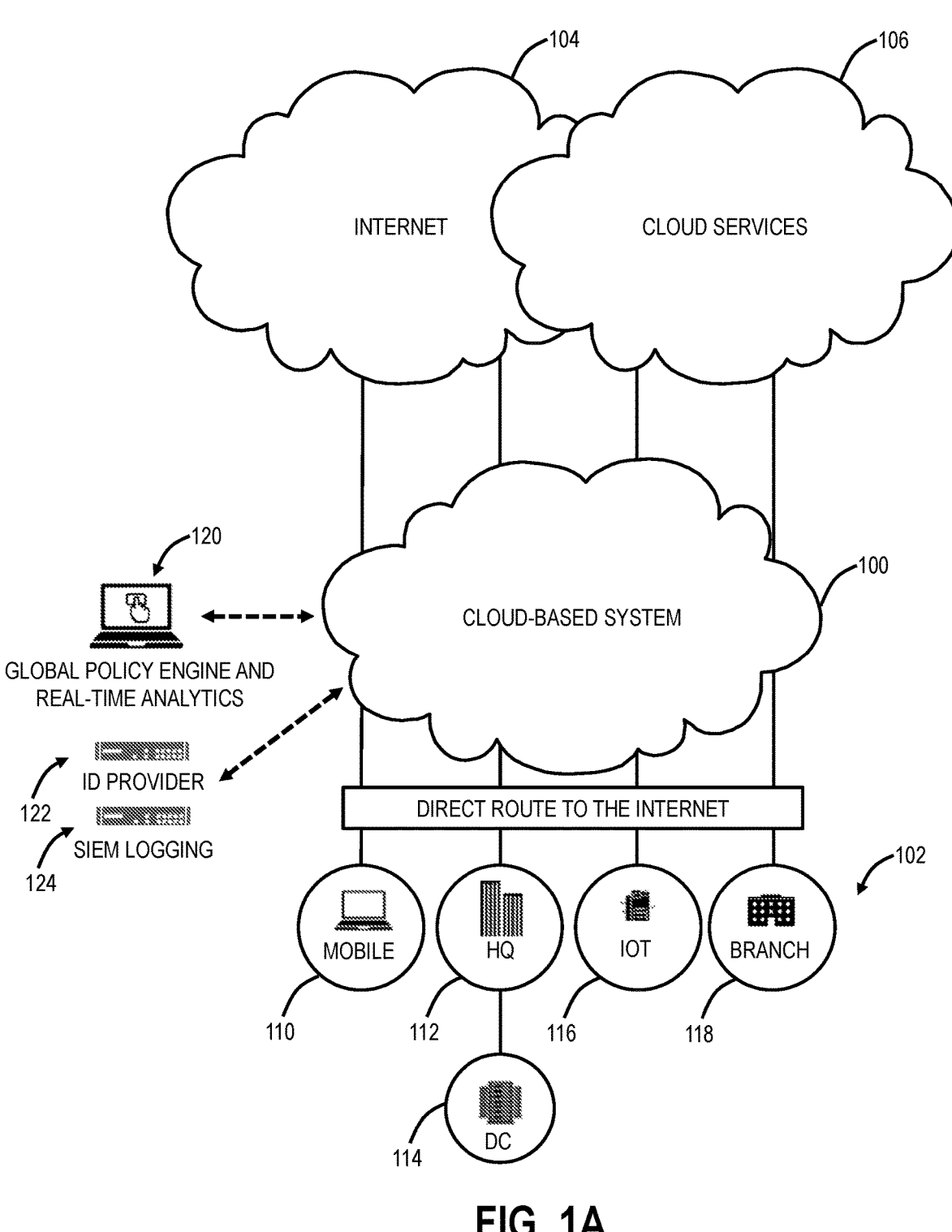
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
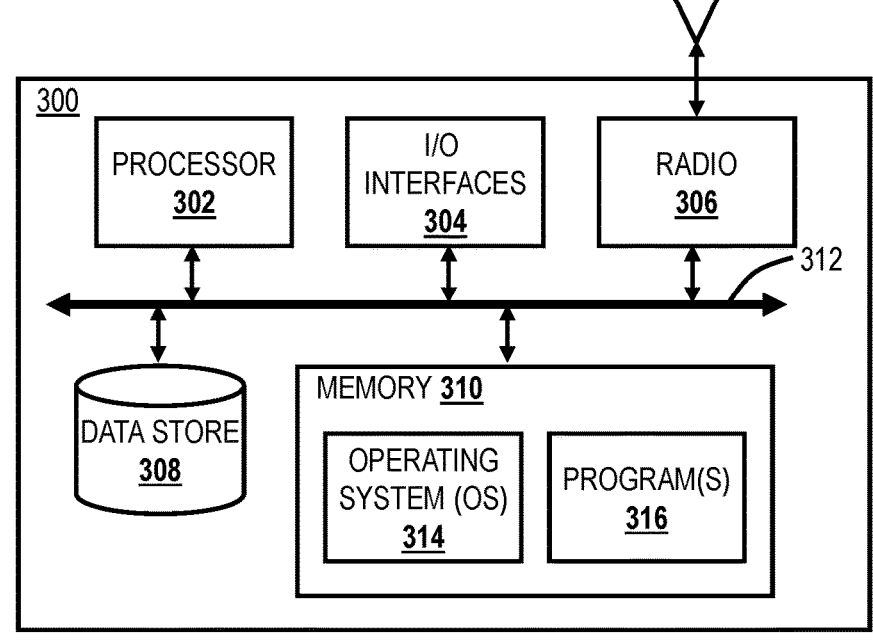

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multifactor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
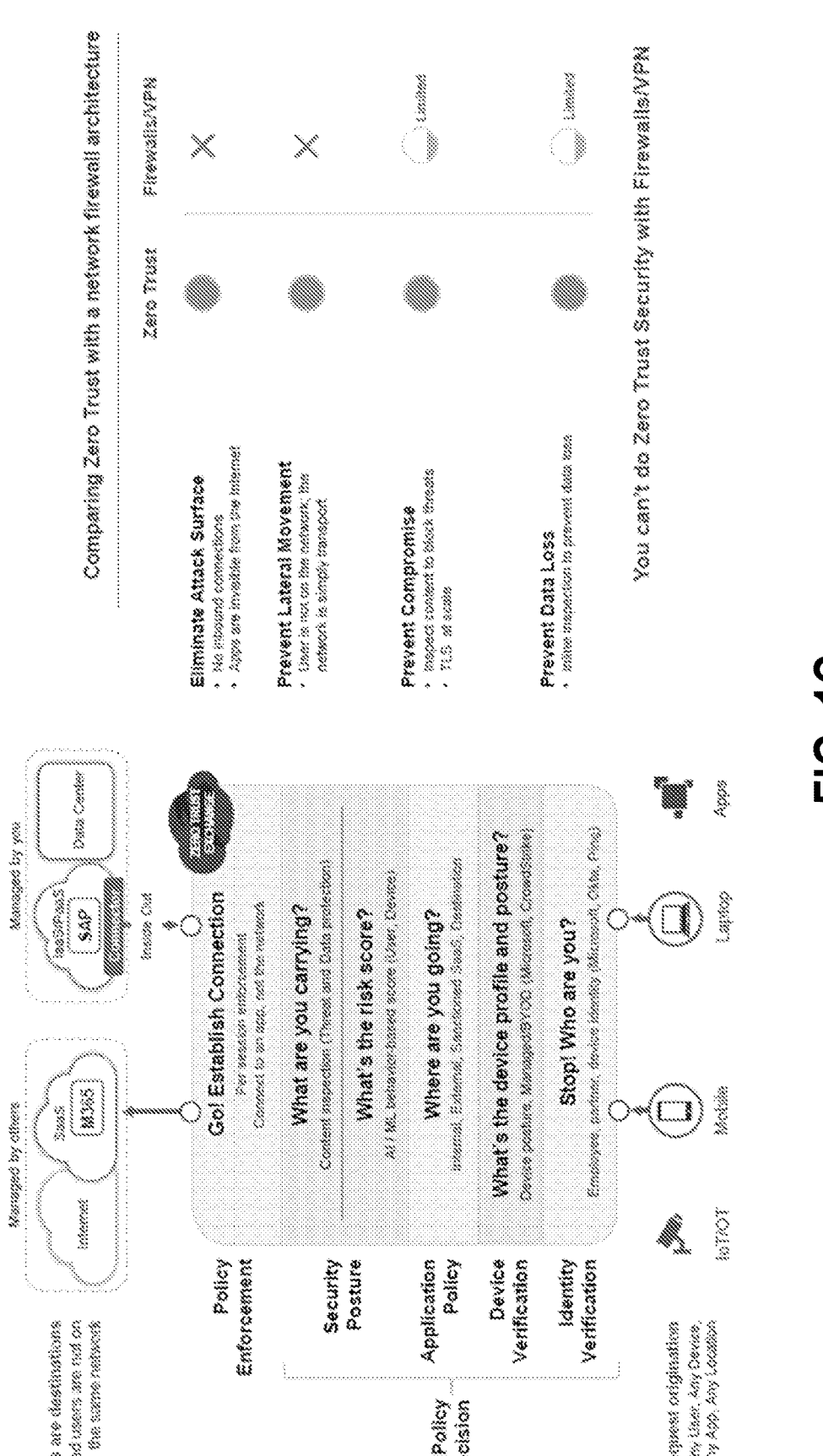
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
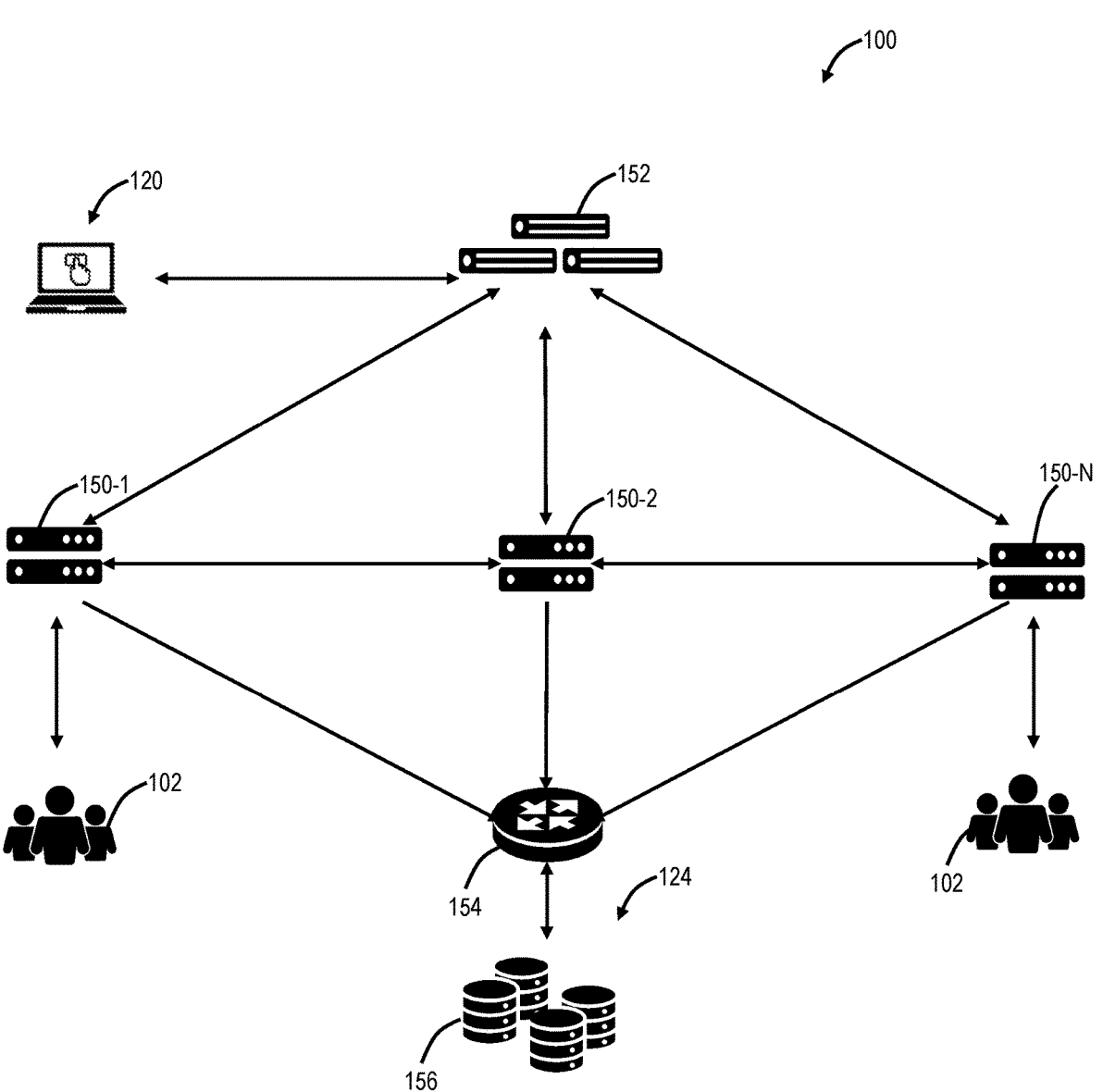
FIG. 2 is a network diagram of an example implementation of the cloud-based system.
Figure 4:
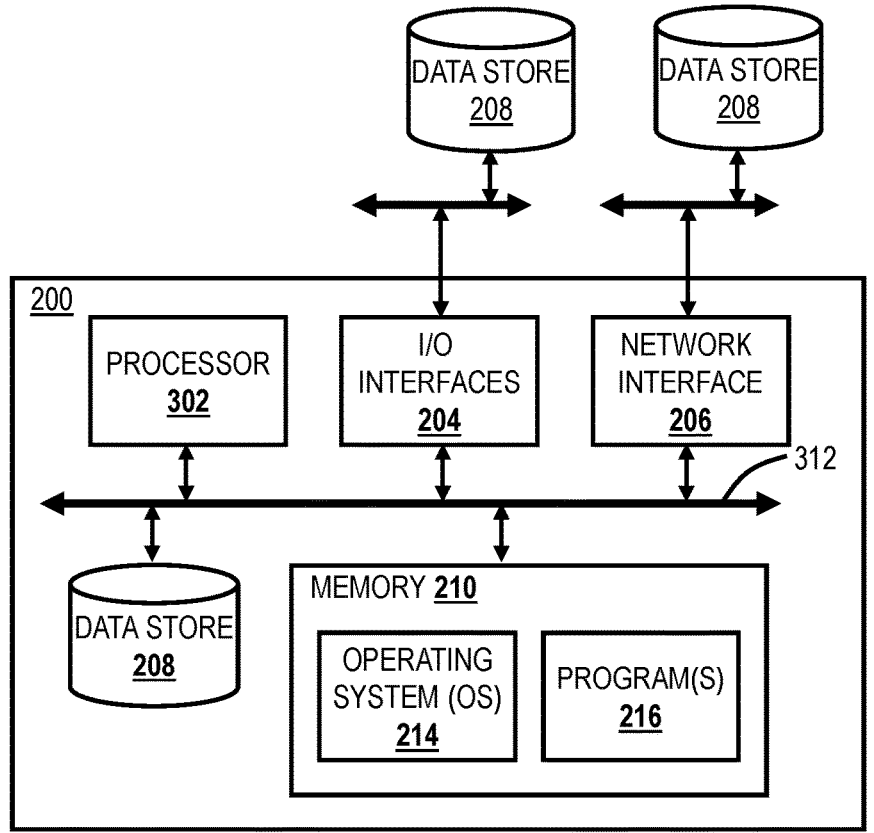
FIG. 4 is a block diagram of a server, which may be used in the cloud-based system, in other systems, or standalone.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provides centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

User Device Application for Traffic Forwarding and Monitoring

Figure 3:
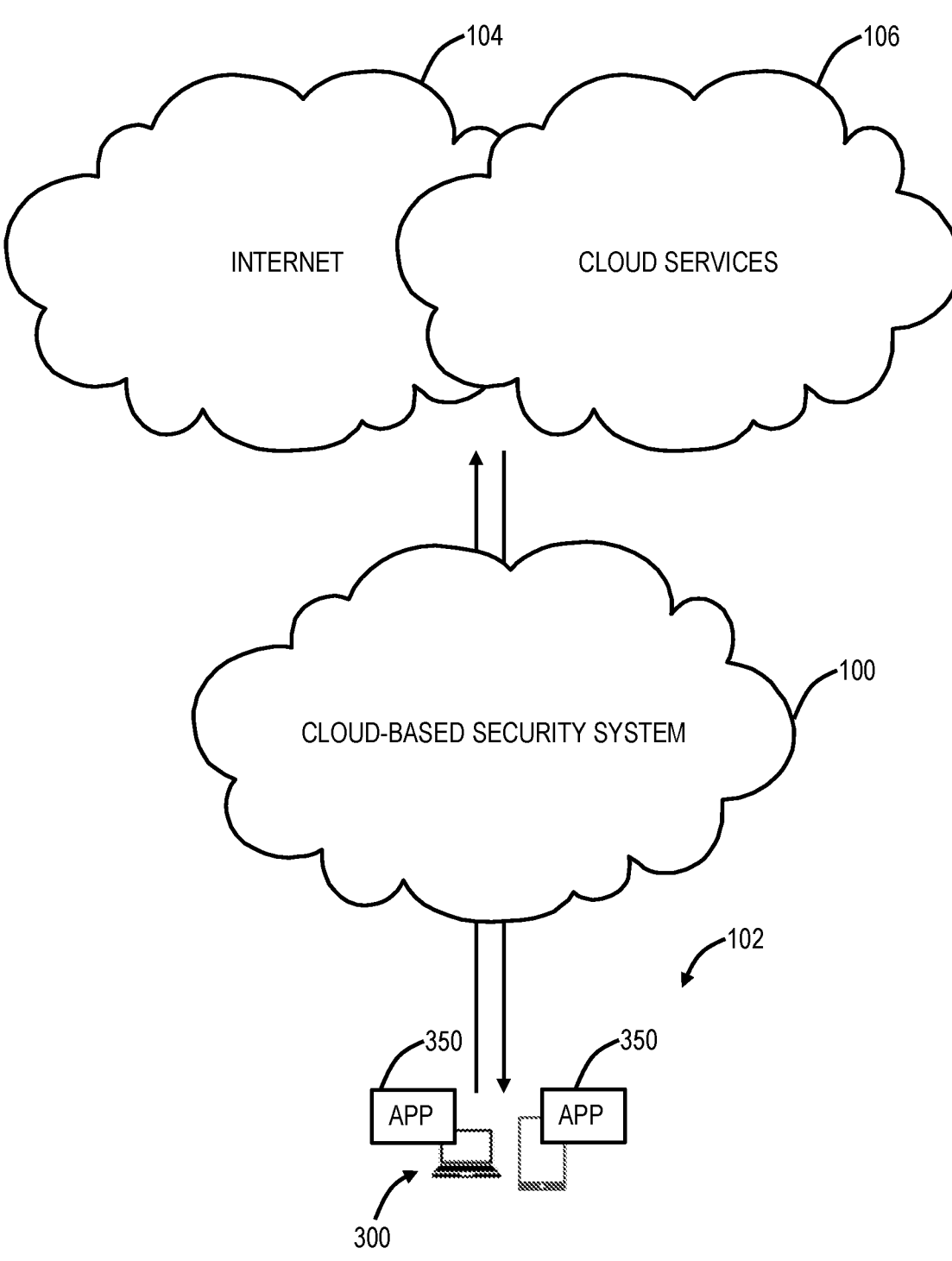
FIG. 3 is a network diagram of the cloud-based system illustrating an application on the user devices with users configured to operate through the cloud-based system.

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

Figure 6:
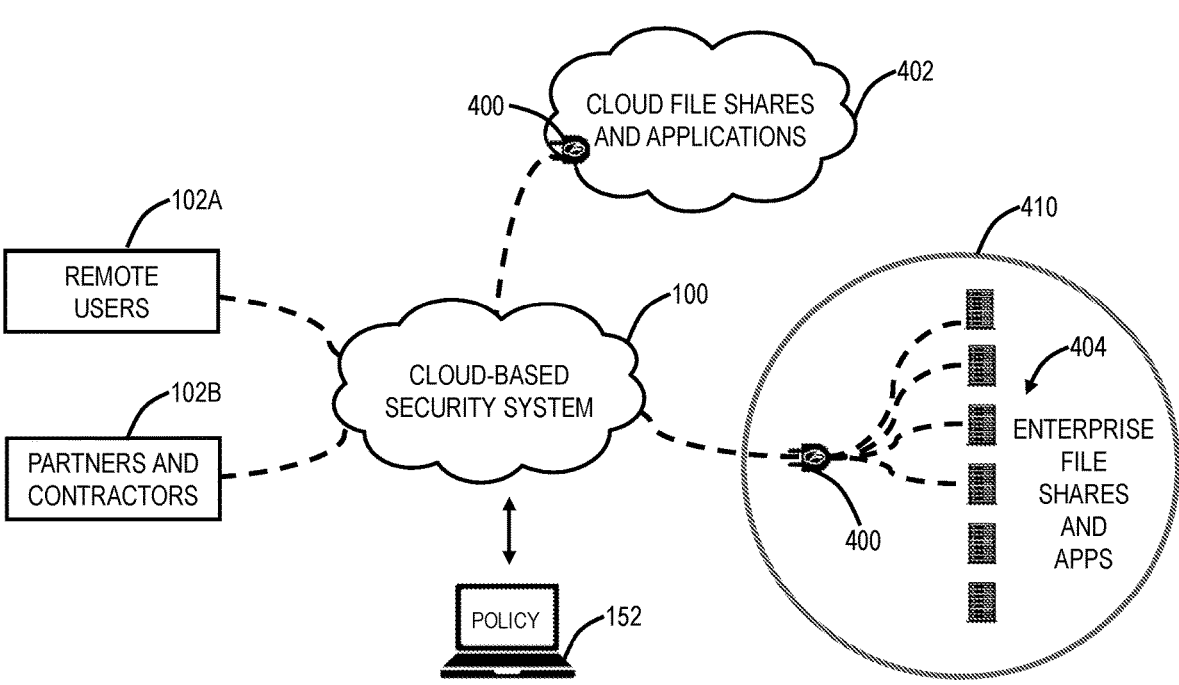
FIG. 6 is a network diagram of a Zero Trust Network Access (ZTNA) application utilizing the cloud-based system.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. As described herein, an application segment is a grouping of defined applications 402, 404, based upon access type or user privileges.

The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

Zero-Trust Policy Using Machine Learning

Again, the conventional approach for access to the applications 402, 404 is manual, i.e., each user 102 is given permission. This worked fine when there were a small set of applications, but the number of applications 402, 404 increases significantly. As such, it has been observed that enterprises simply apply wildcard rules for application 402, 404 access. A wildcard rule grants coarse-grain access such as everyone in the company, everyone in a certain group, everyone in a certain location, etc. Thus, while zero-trust provides the best security profile, the advantage is lost because of the wildcard access, i.e., the attack surface is expanded due to the wildcard access.

To solve this problem, the present disclosure contemplates using machine learning to observe application access and to make policy recommendations. In particular, the present disclosure provides a policy recommendation where the policy is defined as which user group can access the applications 402, 404.

Figure 7:
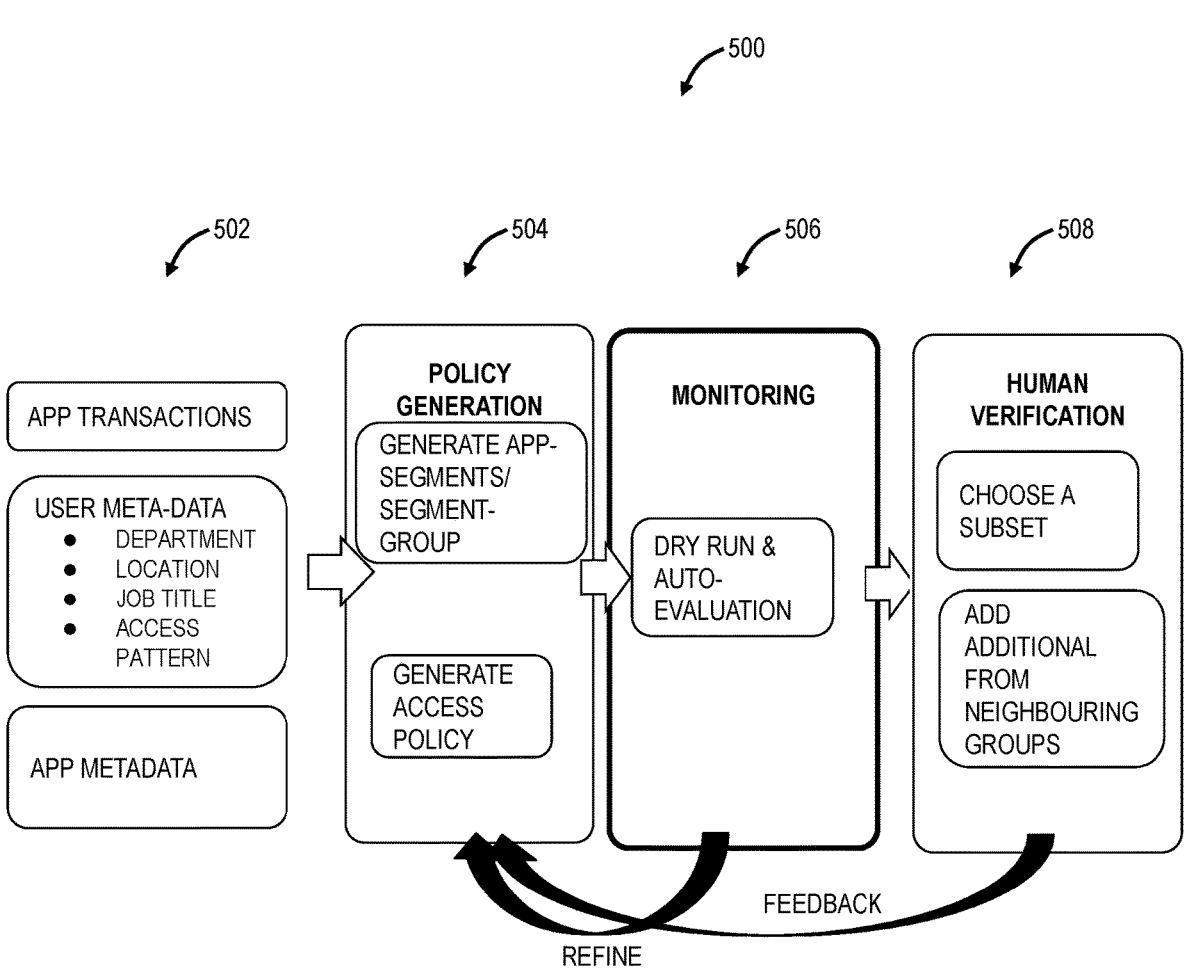
FIG. 7 is a flow diagram of a process for automatic policy recommendations for private application access.

FIG. 7 is a flow diagram of a process 500 for automatic policy recommendations for private application access. Specifically, the process 500 illustrates the workflow for automatic policy recommendations for which includes a data gathering stage 502, a policy generation stage 504, a monitoring stage 506, and a verification stage 508. The data gathering stage 502 includes obtaining data from application transactions and the data includes user meta-data and app meta-data. Here, monitoring is performed to see who (the users 102) accesses the applications 402, 404. Note, the monitoring can be via the cloud-based system 100, the app connectors 400, logs from the applications 402, 404, etc. The applications 402, 404 can be initially configured with wildcard settings, e.g., all users 102 of a company. The monitoring includes analyzing who, when, how long, etc. access the applications 402, 404. The user meta-data describes the users 102 including their department, location, job title, etc. Also, the user meta-data can include the user 102 access pattern, again monitored via the cloud-based system 100.

The data from the data gathering stage 502 is used by the policy generation stage 504 to automatically generate a policy. Again, as described herein, a policy includes user group X can access segment group Y with port Z, where segment group Y includes an app-segment that is a group of applications (or domains). The policy generation stage 504 utilizes machine learning as described herein. The machine learning is configured to generate app-segments, namely which applications (or domains) should be grouped, and user groups, namely which users should be grouped, and access policy, namely which user groups should be provided access to which app-segments. Note, a segment group contains a set of app-segments. In the case where a segment group contains one single app-segment, the term app-segments and segment groups are used here interchangeably.

The monitoring stage 506 is used to refine the policy generation stage 504. Specifically, the present disclosure ensures the policy recommendations are high quality, with little IT admin overhead. Finally, the verification stage 508 is used to finalize the policy recommendations and can include human intervention to choose subsets of the policy, add users, etc., and any verification is also fed back to the policy generation stage 504.

Of note, the stages 502, 504, 506, 508 can be performed in collaboration with one another. For example, the more data gathered in the data gathering stage 502, the more detail the policy generation stage 504 has to generate policies. Also, the more monitoring and verification, the more feedback is provided to the policy generation stage 504.

In an embodiment, the policy generation stage 504 can operate similar to recommendation systems, e.g., via streaming services. This suggests content for users and includes various approaches with collaborative filtering, deep neural nets, etc. However, a key difference here is the user tolerance level for quality. Content obviously is less important than application access. As such, the stages 506, 508 focus on quality and confidence in the recommended policy.

Example Data Input

Again, the data gathering stage 502 provides data for usage of the applications 402, 404 for the policy generation stage 504. Also, the data gathering stage 502 monitors usage when there are loose access restrictions on the applications 402, 404, such as wildcard rules. The monitoring can be via the cloud-based system 100, via logs of the applications 402, 404, via the app connectors 400, and combinations thereof.

The following table illustrates some example monitored data.

| app | Userid | num_active_days |
|---|---|---|
| Application 1 | user 1 | 10 |
| Application 1 | user 2 | 15 |
| Application 2 | user 2 | 1 |
| Application 2 | user 3 | 19 |
| Application 3 | user 2 | 2 |
| Application 3 | user 3 | 18 |
| Application 4 | user 1 | 9 |
| Application 4 | user 3 | 11 |

The table above can be converted to provide feature vectors. Here, the feature vectors for applications 2 and 3 are more similar, thus a ML model could suggest grouping them together in an app-segment or segment group.

| | user 1 | user 2 | user 3 | . . . |
|---|---|---|---|---|
| Application 1 | 10 | 15 | 0 | . . . |
| Application 2 | 0 | 1 | 19 | . . . |
| Application 3 | 0 | 2 | 18 | |
| Application 4 | 9 | 0 | 11 | . . . |

Graphs

Figure 8:
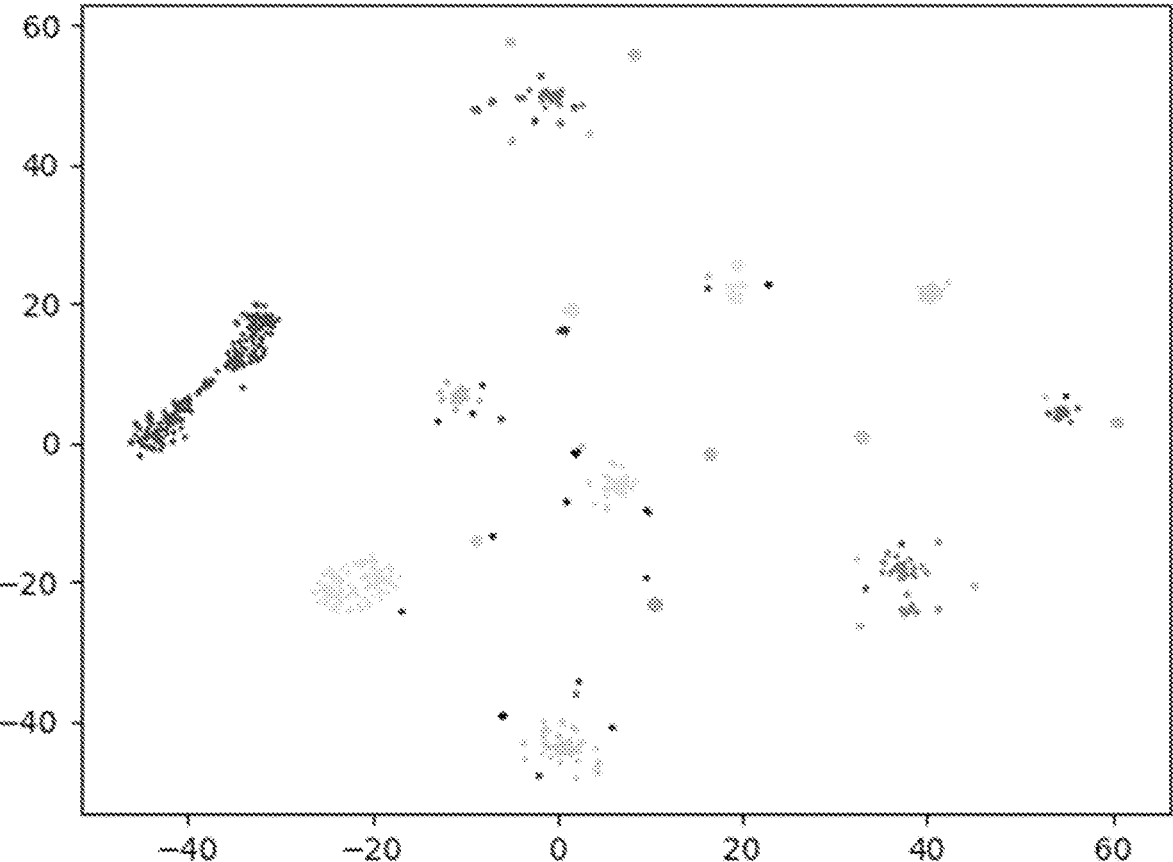
FIG. 8 is a graph of app-segments.
Figure 9:
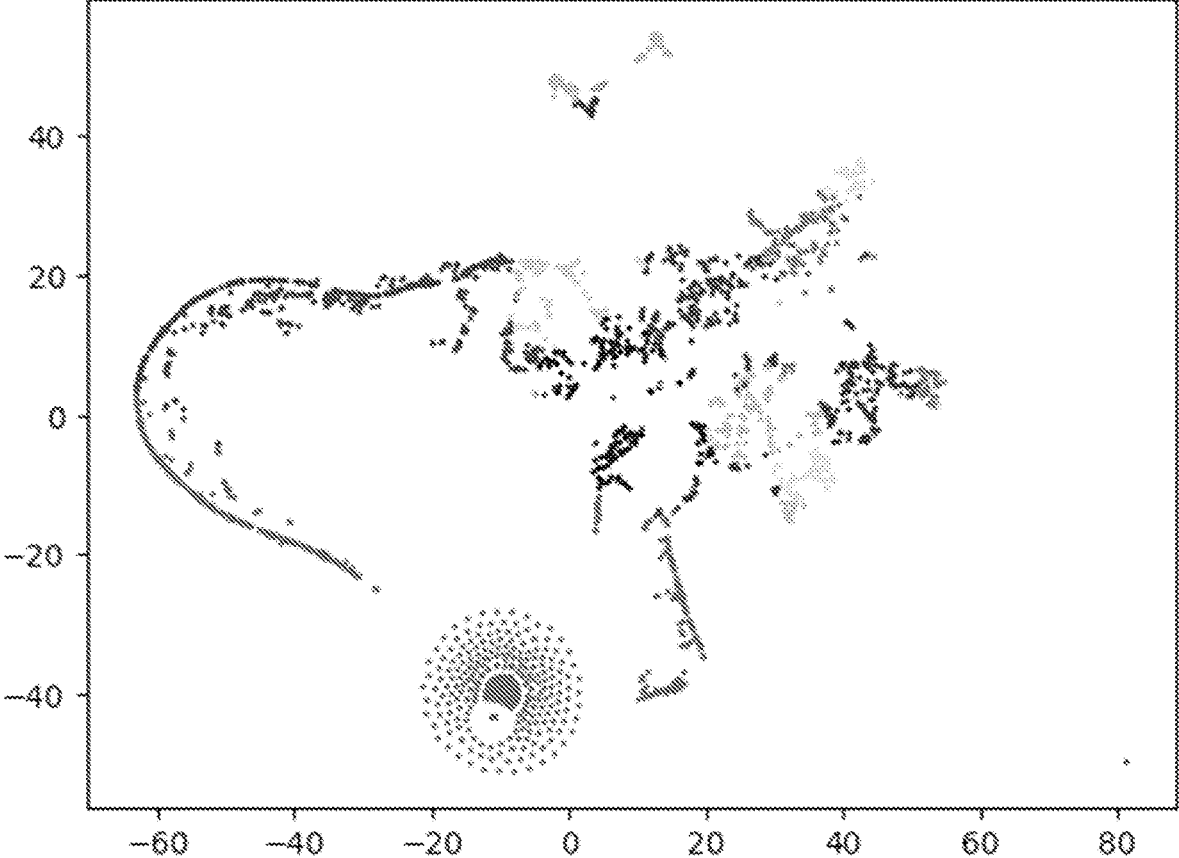
FIG. 9 is a graph of user groups.
Figure 10:
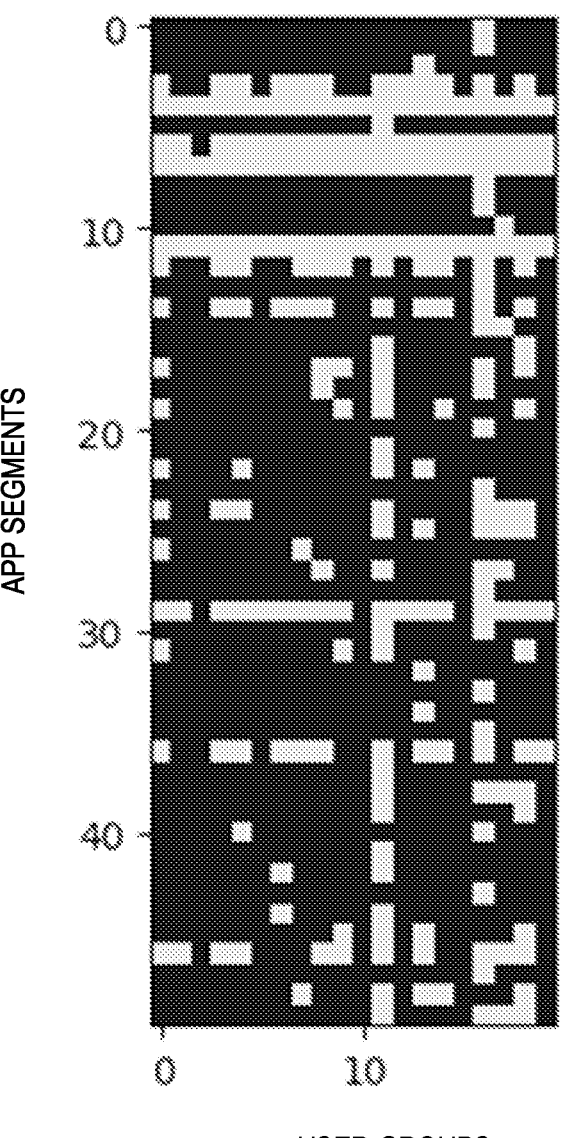
FIG. 10 is an access matrix between app-segments and user groups.

The feature vectors can be used to generate app-segments and user groups, and to form an access matrix. FIG. 8 is a graph of app-segments, FIG. 9 is a graph of user groups, and FIG. 10 is an access matrix between app-segments and user groups. Of note, each dot is an application with the same application having the same shading.

Results

Figure 11:
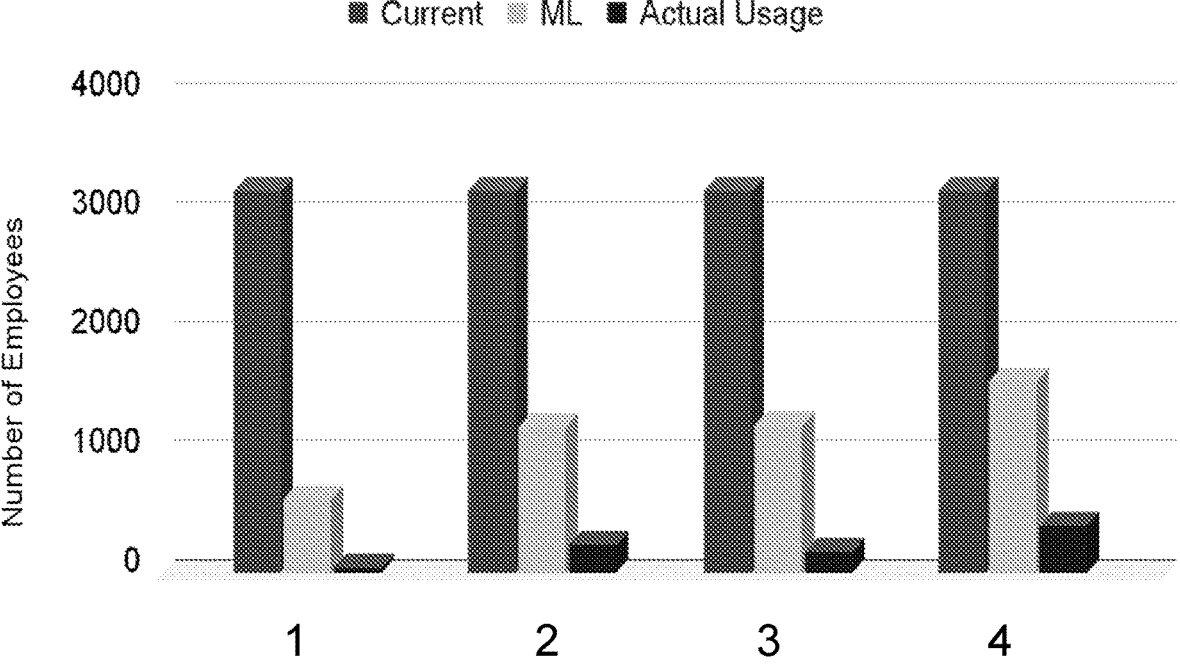
FIG. 11 is a graph of results of the process recommending policy for four example applications.

FIG. 11 is a graph of results of the process 500 recommending policy for four example applications. This illustrates the benefits of using an ML model for policy recommendation. Specifically, FIG. 11 shows the attack surface reduction which results from the tighter access policy suggested by ML. The first bar, labeled "current," is the existing attack surface where all users have access to these four applications. For example, the company can have 3000+ users and the wildcard rule allows access to all users in the current approach. The next bar, labeled "ML," shows what our model suggests, effectively reducing the attack surface by more than 50%. Although the ML suggested access policy has tightened the access control significantly, there is still a gap between the actual user usage and the ML suggestion.

In fact, it is advantageous for this gap to be non-zero, because not all user-app interactions are observed in the training data, thus the ML model needs to generalize from the training data so that it can predict whether to allow or block an unseen user-app interaction. For example, if user 1 was on vacation and did not access application #4 in the past few weeks, yet other user group members do, user 1 should still be allowed access, The generalization ability of the ML model impacts the usability of the product. If a ML model does not generalize well, then some users who should have had access would be blocked, thus incurs tickets for IT admins. To ensure the ML model does not result in disruption to the production environment, we do dry run using past data before deployment. Specifically, the most recent one month data is reserved as test data (of course, this can be other values such as 1- or 2-week data), and then uses the model to predict if user app transactions in the test data should be allowed or blocked, and this gives us a way to simulate and monitor our generated policy before deployment Use Case—Existing Customers For a company already using the ZTNA service for the applications 402, 404, the process 500 is akin to assigning a new category. Also, this existing customer already has data for app-segments and user groups for existing applications 402, 404. The input here can be log data from the ZTNA service, existing user groups, and newly discovered applications 402, 404. The goal here is to provide policy recommendation to either the existing applications 402, 404 (e.g., where there is wildcard access) and/or the newly discovered applications 402, 404.

The output here is a mapping of the newly discovered applications 402, 404 to either existing app-segments or to new app-segment. The policy generation stage 504 can use machine learning techniques such as a similarity metric based on cosine. There is no need for clustering given the majority of clusters exist.

For the input data, this can include the user or user-group's traffic pattern. Each element is the usage for each group. The usage could be the number of transactions or the number of active usage days. Additional transformation like log or Term Frequency-Inverse Document Frequency (TF-IDF) transformation could be applied. The input data can also use the port traffic pattern, leveraging domain knowledge. For example, port "139" and "445" could be grouped together, thus assigning the same port_tag (for normalization purpose), which allows better generalization. There can also be heuristic based on ports, e.g., domains whose traffic mainly went through 3389 are RDP applications. Other data can include hostnames, geolocation, etc. For example, app-segments can be separated in each geographic region. An organization's network addressing structure could also be leveraged as domain knowledge. For example, two apps in the same subnets (e.g., both in 10.36.0.1/24) or in the consecutive IP subnets (e.g. in 10.36.0.1/24 and 10.36.0.2/24 respectively) are more likely to be in the same app-segment compared to those in the subnets "further away" from each other (e.g., 10.36.0.3/24 and 10.36.200.3/24 respectively).

There is a question on how to decide when an existing app-segment is not similar enough, thus needing a new app-segment. This can be solved using a distance threshold based on the customer feedback.

Use Case—New Customers

With new customers, there are no existing app-segments or user groups. There is a requirement to monitor usage over time to get log data, such as with wildcard access. The output includes user groups and mapping from the applications 402, 404 to app-segments. The policy generation stage 504 can use k-means clustering or DBSCAN clustering (Density-based spatial clustering of applications with noise (DB-SCAN)) machine learning techniques.

Here, the log data is analyzed using clustering to generate user-groups which are then leveraged to generate app-grouping (app-segments). Imagine the case of X*Y=Z, where you observe Z, while needing to hypothesize X and Y, where X is user-grouping, while Y is app-grouping. Fixing X helps hypothesizing Y, since there is one less moving piece.

Figure 12:
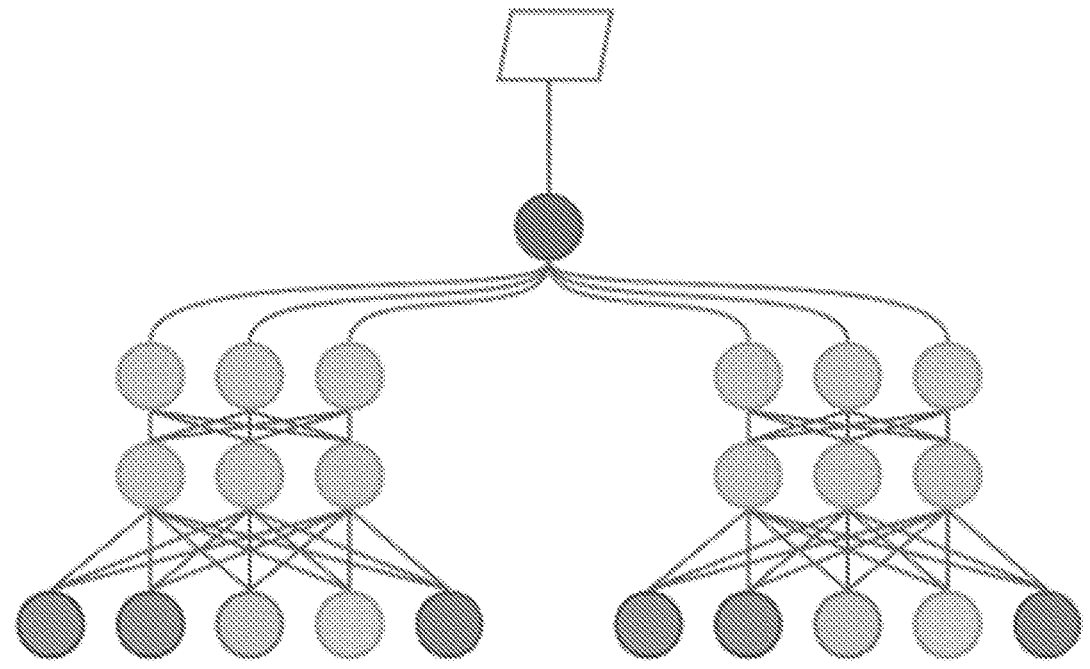
FIG. 12 is a two-tower neural network that can be used to generate a machine learning model with various features.

Alternatively, it is possible to use collaborative filtering or word-embedding type of recommendation to generate both user-grouping and app-grouping from the log data. FIG. 12 illustrates a tree that can be used to generate a machine learning model with various features. Here, the user job title, user locations, user app usage pattern, domain names, port usage pattern, organizations' network addressing structure, etc. can be used as features to generate both user-grouping and app-grouping from the log data. FIG. 12 is from blog.tensorflow.org/2020/09/introducing-tensorflow-recommenders.html, the contents of which are incorporated by reference herein.

It is also possible to leverage the log data from the cloud-based system 100 to help user-grouping: SaaS access pattern. Each element is the usage for SaaS applications 402, 404, such as Salesforce or Amazon Web Services. The usage could be the number of transactions or the number of active usage days. Additional transformation like log transformation could be applied. Translate from existing policy (from other vendors) as a starting point. Better than wildcard matching.

Metrics

The metrics include 1) how good is the machine learning-generated policy and 2) how much impact does this automation have. For 1), the metrics include users 102 who used to have access with the previous wildcard policy that are now being denied. This could be positive, e.g., engineers having access to Customer Relationship Management (CRM) apps that they have no need for. This can be measured by the number of tickets raised for denied access. Another metric can include people who were banned due to the existing non-wildcard policy that now have access. If no policy exists for new customers, then the goal would be reducing the access surface (the tighter the access control the better). Percentage of reduction of the user access, e.g., attack surface reduction, is another metric for the effectiveness of the tighter access policy generated by ML. For 2), the metrics are reduction in customer onboarding time, support time, and IT operations efforts.

Machine Learning

Our model can speed up the configuration process for a zero-trust policy by assisting in all three stages during configuration. Below are the three stages during the configuration process.

1) Define segmentation-group, where each segmentation-group could consist of a few app-segments. An app-segment includes a set of apps, where each app is characterized by domain/IP address, port, protocol.

2) Define user-groups, where each user-group consists of a list of users.

3) Define Access Policy, which specifies which user-groups should be allowed to access a segmentation-group or an app-segment.

ML Models for Stages 1 and 2

Again, the problem is similar to content recommendation problem, though that is user-to-content while we have user-to-app. Specifically, the concept of app-segment is similar to the movie category/genre, which groups a set of similar movies together.

There are different paradigms, we mainly consider the following three paradigms and ensemble the results from different models.

Paradigm 1: Generate the Grouping of Apps Using the Existing User-Grouping

This is only applicable to the case when the user-groups are provided by ZTNA customers. For example, department information or job title or the company reporting chain (manager information). Feature vectors for apps: access pattern for user-groups (e.g., departments). Each app is characterized by the user-groups who access it and the corresponding frequency. Specifically, each column in a feature vector is a value corresponding to a user-group, where the value could be the number of transactions, the number of active days, or the percentile of the usage.

Feature compression: due to the curse of dimensionality, the raw features are too sparse to generate good grouping/clustering results. Therefore, we consider the following two additional steps to process the raw features.

i) Normalization: we consider using one of the following types of normalization. Log_transform; min-max-scaler; standard-scaler; TF-IDF.

ii) Dimensionality reduction using UMAP (Uniform Manifold Approximation and Projection for Dimension Reduction) or Autoencoder.

We use clustering approaches (as detailed below) to group the apps based on their compressed feature vectors.

Paradigm 2: Generate the Grouping of Apps and Users Sequentially

Feature vectors for apps: access pattern for users. Each app is characterized by the users who access it and the corresponding frequency. Specifically, each column in a feature vector is a value corresponding to a user, where the value could be the number of transactions, the number of active days, or the percentile of the usage. The tables in the Example Data Input section are an example of feature vectors. There might be noise in the input, thus we could consider cleaning up input by applying a certain threshold to remove infrequent user-app pairs.

This is similar to that in Paradigm 1, except the user-grouping is unknown yet, thus it is characterized by each user's access pattern, instead each user-group's access pattern The remaining feature compression and clustering is similar to that in paradigm 1.

Grouping users: Feature vectors for users: access pattern of apps. Each user is characterized by the apps they have accessed. For example, users access engineering related apps, such as, code base or database, more often than other users are more likely to be engineers. If the app-segments have been generated from the earlier step, we can replace the apps with app-segments to help the model generalize better, since it reduces the sparsity of feature vectors. The remaining feature compression and clustering is similar to the above—Note that grouping apps (stage 1) and group users (stage 2) are interchangeable in order. This means we could generate users-grouping first and then leverage the results of user-grouping to group apps.

In addition, there could be multiple iterations of sequential optimization. For example, group apps first, then leverage the results of app-grouping to group users, then further leverage the new user-grouping to re-generate the app-grouping. This iterative process (sequential optimization) could continue until the results become stable (little change with more iterations).

Paradigm 3: ML-Learn the Feature Representation of Apps and Users *Jointly*

An embedding is a feature representation of an item (e.g., an app or a user). It is shorter than the raw feature and can be treated as a compressed version of the raw features. Collaborative filtering (CF) is a traditional way to learn feature representation of both apps and users together. Specifically, it does Singular Vector Decomposition over an app-user co-occurrence matrix.

However, CF cannot take in additional features like user meta-data and app meta-data. Therefore, we consider two-tower neural networks like those in tensorflow_recommender, such as, Yi, Xinyang, Ji Yang, Lichan Hong, Derek Zhiyuan Cheng, Lukasz Heldt, Aditee Kumthekar, Zhe Zhao, Li Wei, and Ed Chi. "Sampling-bias-corrected neural modeling for large corpus item recommendations." In Proceedings of the 13th ACM Conference on Recommender Systems, pp. 269-277. 2019, the contents of which are incorporated by reference herein.

FIG. 12 is an example architecture of the neural network, where the item corresponds to the app. User features (user meta-data) include (but not restricted to): User location, job title, Department, Manager, Behavior pattern machine-learned from data sources other than the ZTNA. For example, we could leverage data from the cloud-based system 100 to further enrich the feature vectors for users.

App features (app meta-data) include (but not restricted to): port and protocol usage pattern; the computer process that initiated the connection to the application; similarity based on domain names; an organization's network addressing structure; app location.

For example, "abc0123.company.com" and "abd0124.company.com" are similar to each other. In the case where there is no FQDN, but only IP addresses, the IP addresses in the same subset indicates that the two apps could be similar. For example, 131.24.10.70 are in the same subnet with 131.24.10.81 with mask 24. App location: hosted on servers within the same subsets or data centers Note that the above app features could be input features for stand-alone models, which could be used for model ensemble later. Apart from learning the representation for users and apps together, paradigm 3 also has the advantage of predicting unseen user-app interactions. This means we could apply the learned model to fill in user-app interactions not observed during the training time period, while potentially appearing in the future (during test or deploying phase)

Ensemble of a Set of Different Models

For the items remaining in the same group throughout different models, they are associated with high confidence scores and presented to the users on the top. We keep the different parts among different models as alternatives and the alternatives are ranked by the confidence level.

The advantage of ensemble includes (1) provide the confidence score over the recommended grouping (2) provide informative alternatives. The ensemble could be in parallel, as well as sequentially. Specifically, we could present the different clustering results as alternatives, while we could also stitch the model sequentially, so that one clustering is applied on top of the earlier clustering like that in hierarchical clustering.

Note that the results of apps-grouping could be segment-group or app-segments. We did not differentiate the two in the section about app-grouping: it could be either-way. If it is considered as a segment-group, each app-group can be further decomposed into smaller groups corresponding to app-segments. The further decomposition could be based on functionality of the apps, which could be hypothesized from the port/protocol usage and the computer process that initiates the connection or the server-group information.

Clustering Approaches

Clustering is an unsupervised learning technique. We considered the following clustering approaches:

K-means clustering. We can use the elbow method to auto-select the number of clusters.

DBScan

Hierarchical DBScan

Graph-based community detection algorithm

Stage 3: Define Access Policy

After obtaining the segmentation-group/app-segments and user-groups from stage 1 and stage 2, we can define the access policy. For a segmentation-group or an app-segments, 1) we remove user-groups who never access those app-segments 2) For the remaining user groups who have shown the usage in the log data, we ranked the user-groups by the percentage of users who access the segmentation-group (with respect to the total number of users in the user group).

3) We present all of those user-groups to the customer and suggest access-deny for those user-groups where the percentage of usage is lower than a threshold. The reason we still keep those as options is to give customers a chance to verify in case that there is a real need.

Sequential Pattern of Application Access

In addition to the various techniques described herein, it was determined that leveraging sequential patterns of application access is shown to significantly improve application segmentation metrics. As described herein, a sequential pattern means that a particular user 102 accesses a plurality of applications 402, 404 in a given time period. For example, engineers may access software design tools (e.g., source code repository such as bitbucket) and product tracking tools (e.g., Jira) together. Salespeople may access customer relationship management (CRM) tools and inventory management tools together. That is, the role of the user 102 and the similarity between the applications can be derived accurately by noticing and detecting these patterns.

Of note, the present disclosure automates application access for users based on monitoring user activity and recognizing that there are sequential patterns of application access. Leveraging sequential patterns of application access is shown to significantly improve application segmentation metrics. Experiments show leveraging the sequential patterns of application access significantly improve app segmentation metrics based on some example companies that were evaluated.

As described herein, a sequential patterns of application access includes some sequence of application access over some period of time. For example, a user 102 accesses application A, then application B, means the user 102 is likely going to access application C as well. Thus, the sequence of A+B+C can be used to give the user 102 access to the application C.

FIG. 13 is a flowchart of a process 600 for generating zero-trust policy for application access based on sequence-based application segmentation. The process 600 contemplates implementation as a method with steps, via a processor configured to implement the steps, via the cloud-based system 100 configured to implement the steps, via the server 200 configured to implement the steps, and via a non-transitory computer-readable storage medium having computer readable code stored thereon for programming at least one processor to perform the steps.

The process 600 includes obtaining log data for a plurality of users of an enterprise where the log data relates to usage of a plurality of applications by the plurality of users and user metadata (step 602); analyzing the log data to determine one or more sequential patterns of application access (step 604); determining i) app-segments that are groupings of application of the plurality of applications and ii) user-groups that are groupings of users of the plurality of users, based on the log data (including user metadata) and the one or more sequential patterns of application access (step 606); and providing access policy of the plurality of applications based on the user-groups and the app-segments (step 608). The one or more sequential patterns of application access include a sequence of accessing a plurality of applications in a given time period.

The process 600 can further include monitoring the access policy over time based on ongoing log data, manual verification of the access policy, and incidents where users are prevented from accessing any application; and adjusting any of the determined app-segments and the user-groups, based on the monitoring. The usage of the plurality of applications by the plurality of users can be via wildcard rules allowing a large subset of users to access the plurality of applications. The access policy of the plurality of applications can have less access than via the wildcard rules.

The log data can be transformed to feature vectors, and wherein the determining includes clustering with the feature vectors. The log data can be obtained over a period of time and the determining and providing is performed over the period of time until the access policy meets a quality threshold. The enterprise can be an existing customer of a cloud service and the access policy is for one of existing applications and new applications, and wherein the determining is based on a similarity metric with existing user-groups. The enterprise can be a new customer of a cloud service, and wherein the determining is based on clustering to determine the user-groups and the app-segments. The user-groups are fixed to determine the app-segments.

The access policy can include which user-group can access which app-segments on which ports. The determining can be via a machine learning model that uses features including any of port and protocol usage pattern; the computer process that initiated the connection to the application; similarity based on domain names; an organization's network addressing structure; app location; user location; job title; department; manager; and behavior patterns. The machine learning model can include an ensemble of different models.

Figure 14:
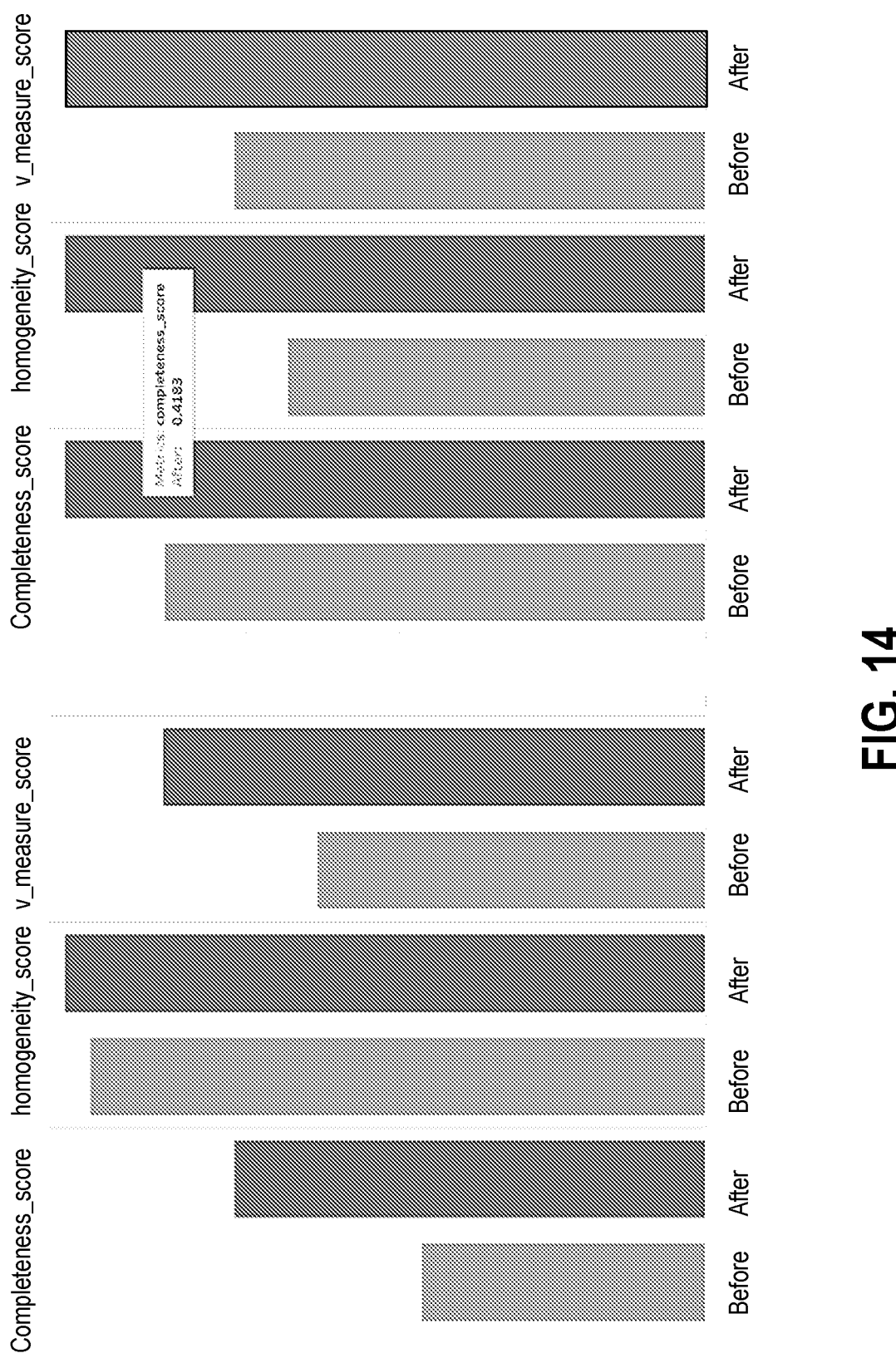
FIG. 14 is bar graphs of two example implementations with and without the process, i.e., "before" and "after."

FIG. 14 is bar graphs of two example implementations with and without the process 600, i.e., "before" and "after." There are three metrics to define zero-trust policy for application access based on sequence-based application segmentation, namely completeness, homogeneity, and v measure. Of note, the addition of the sequence-based application segmentation improves each of these scores.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc., described herein can be used in any and all combinations with each other.

What is claimed is:

1. A non-transitory computer-readable storage medium having computer readable code stored thereon for programming at least one processor to perform steps of:
   obtaining log data for a plurality of users of an enterprise where the log data relates to usage of a plurality of applications by the plurality of users and user metadata;
   analyzing the log data to determine one or more sequential patterns of ordered transitions of application access;
   determining i) app-segments that are groupings of application of the plurality of applications and ii) user-groups that are groupings of users of the plurality of users, based on the log data and the one or more sequential patterns of application access, wherein the sequential patterns are used to compute transition probabilities or transition-likelihood metrics between applications to infer application similarity and correlated user roles; and providing access policy of the plurality of applications based on the user-groups and the app-segments.

2. The non-transitory computer-readable storage medium of claim 1, wherein the steps further include
   monitoring the access policy over time based on ongoing log data, manual verification of the access policy defining human intervention for refining of the policy, and incidents where users are prevented from accessing any application; and
   adjusting any of the determined app-segments and the user-groups, based on the monitoring.

3. The non-transitory computer-readable storage medium of claim 1, wherein the one or more sequential patterns of application access include a sequence of accessing a plurality of applications in a given time period and are configured to define a role of the user and a similarity between the applications.

4. The non-transitory computer-readable storage medium of claim 1, wherein the usage of the plurality of applications by the plurality of users is via wildcard rules allowing a large subset of users to access the plurality of applications.

5. The non-transitory computer-readable storage medium of claim 4, wherein the access policy of the plurality of applications has less access than via the wildcard rules.

6. The non-transitory computer-readable storage medium of claim 1, wherein the log data and the one or more sequential patterns of application access is transformed to feature vectors, and wherein the determining includes clustering with the feature vectors.

7. The non-transitory computer-readable storage medium of claim 1, wherein the log data is obtained over a period of time and the determining and providing is performed over the period of time until the access policy meets a quality threshold.

8. The non-transitory computer-readable storage medium of claim 1, wherein the enterprise is an existing customer of a cloud service and the access policy is for one of existing applications and new applications, and wherein the determining is based on a similarity metric with existing user-groups.

9. The non-transitory computer-readable storage medium of claim 1, wherein the enterprise is a new customer of a cloud service, and wherein the determining is based on clustering to determine the user-groups and the app-segments.

10. The non-transitory computer-readable storage medium of claim 9, wherein user-groups are fixed to determine the app-segments.

11. The non-transitory computer-readable storage medium of claim 1, wherein the access policy includes which user-groups can access which app-segments on which ports.

12. The non-transitory computer-readable storage medium of claim 1, wherein the determining is via a machine learning model that uses features including any of port and protocol usage pattern; the computer process that initiated the connection to the application; similarity based on domain names; Internet Protocol (IP) address; an organization's network addressing structure; app location; user location; job title; department; manager; and behavior patterns.

13. The non-transitory computer-readable storage medium of claim 12, wherein the machine learning model includes an ensemble of different models.

14. A method comprising steps of:
obtaining log data for a plurality of users of an enterprise
where the log data relates to usage of a plurality of
applications by the plurality of users and user metadata;
analyzing the log data to determine one or more sequen-
tial patterns of ordered transitions of application access;
determining i) app-segments that are groupings of appli-
cation of the plurality of applications and ii) user-
groups that are groupings of users of the plurality of
users, based on the log data and the one or more
sequential patterns of application access, wherein the
sequential patterns are used to compute transition prob-
abilities or transition-likelihood metrics between appli-
cations to infer application similarity and correlated
user roles; and
providing access policy of the plurality of applications
based on the user-groups and the app-segments.
15. The method of claim 14, wherein the steps further
include
monitoring the access policy over time based on ongoing
log data, manual verification of the access policy, and
incidents where users are prevented from accessing any
application; and

26 adjusting any of the determined app-segments and the
user-groups, based on the monitoring.
16. The method of claim 14, wherein the one or more
sequential patterns of application access include a sequence
of accessing a plurality of applications in a given time
period.
17. The method of claim 14, wherein the usage of the
plurality of applications by the plurality of users is via
wildcard rules allowing a large subset of users to access the
plurality of applications.
18. The method of claim 14, wherein the log data and the
one or more sequential patterns of application access is
transformed to feature vectors, and wherein the determining
includes clustering with the feature vectors.
19. The method of claim 14, wherein the log data is
obtained over a period of time and the determining and
providing is performed over the period of time until the
access policy meets a quality threshold.
20. The method of claim 14, wherein the enterprise is an
existing customer of a cloud service and the access policy is
for one of existing applications and new applications, and
wherein the determining is based on a similarity metric with
existing user-groups.

* * * * *